(12) United States Patent
Birnbaum et al.

(10) Patent No.: US 10,639,847 B2
(45) Date of Patent: May 5, 2020

(54) METHOD AND APPARATUS FOR VOLUMETRIC MANUFACTURE OF COMPOSITE OBJECTS

(71) Applicant: The Government of the United States of America, as represented by the Secretary of the Navy, Arlington, VA (US)

(72) Inventors: Andrew J. Birnbaum, Washington, DC (US); Athanasios Iliopoulos, Rockville, MD (US); John Steuben, Oxen Hill, MD (US); John G. Michopoulos, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 311 days.

(21) Appl. No.: 15/877,675

(22) Filed: Jan. 23, 2018

(65) Prior Publication Data

US 2018/0215094 A1 Aug. 2, 2018

Related U.S. Application Data

(60) Provisional application No. 62/451,103, filed on Jan. 27, 2017.

(51) Int. Cl.
*B33Y 10/00* (2015.01)
*B29C 64/295* (2017.01)
(Continued)

(52) U.S. Cl.
CPC .......... *B29C 64/295* (2017.08); *B22F 3/1055* (2013.01); *B29C 35/0266* (2013.01);
(Continued)

(58) Field of Classification Search
CPC ... B29C 64/295; B29C 64/264; B29C 64/141; B29C 64/165; B29C 64/386;
(Continued)

(56) References Cited

U.S. PATENT DOCUMENTS

| 4,863,538 A | 9/1989 | Deckard |
| 4,929,402 A | 5/1990 | Hull |

(Continued)

FOREIGN PATENT DOCUMENTS

| KR | 10-2016-0017783 A | 2/2016 |
| KR | 10-2016-0113062 A | 9/2016 |
| WO | 2014126837 A2 | 8/2014 |

OTHER PUBLICATIONS

Search Report and Written Opinion dated May 4, 2018 in corresponding PCT Application No. PCT/US2018/014801.
(Continued)

*Primary Examiner* — Christina A Johnson
*Assistant Examiner* — Xue H Liu
(74) *Attorney, Agent, or Firm* — US Naval Research Laboratory; Joslyn Barritt

(57) ABSTRACT

A method and apparatus for volumetric manufacture of three-dimensional physical objects from a precursor material based on plans, specifications, or virtual models. A build domain is provided comprising an enclosed three-dimensional wire grid in which the wires are connected to one or more electric power sources configured to controllably and addressably apply power to one or more individual wires to cause the wires to dissipate heat produced by Joule heating to the surrounding precursor material situated within the build domain, and to further allow for the control of the three-dimensional heat distribution and accordingly temperature distribution within the build domain. By activating and deactivating one or more predetermined subsets of the (Continued)

wires in the build domain, the precursor can be caused to melt and/or solidify so as to form a three-dimensional object within the build domain.

9 Claims, 13 Drawing Sheets

(51) Int. Cl.
|   |   |
|---|---|
| B29C 64/165 | (2017.01) |
| B33Y 30/00 | (2015.01) |
| B29C 35/02 | (2006.01) |
| B29C 64/141 | (2017.01) |
| B29C 64/264 | (2017.01) |
| B22F 3/105 | (2006.01) |
| B29K 101/10 | (2006.01) |
| B29K 105/00 | (2006.01) |

(52) U.S. Cl.
CPC ........ *B29C 35/0272* (2013.01); *B29C 64/141* (2017.08); *B29C 64/165* (2017.08); *B29C 64/264* (2017.08); *B33Y 10/00* (2014.12); *B33Y 30/00* (2014.12); *B22F 2003/1056* (2013.01); *B29C 2035/0211* (2013.01); *B29K 2101/10* (2013.01); *B29K 2105/0002* (2013.01); *B29K 2105/0058* (2013.01)

(58) Field of Classification Search
CPC ....... B29C 64/393; B33Y 10/00; B33Y 30/00; B33Y 50/00; B33Y 50/02
See application file for complete search history.

(56) References Cited

U.S. PATENT DOCUMENTS

| 5,121,329 A | 6/1992 | Crump |
| 8,728,589 B2 | 5/2014 | Auyeung et al. |
| 2011/0189498 A1* | 8/2011 | Nagata ................ C21D 1/72 |
| | | 428/596 |
| 2016/0107380 A1 | 4/2016 | Smoot et al. |
| 2016/0375640 A1 | 12/2016 | Cho et al. |
| 2017/0326816 A1* | 11/2017 | Seepersad ............ B29C 64/291 |

OTHER PUBLICATIONS

KR_2016_0017783_Abstract.
KR_2016_0113062_Abstract.
A. Sa et al., "Parametric 3D-fitted frames for packaging heritage artefacts," The 13th international symposium on virtual reality, archaeology and cultural heritage VAST, 2012.
Alderson Neira Arce, "Thermal Modeling and Simulation of Electron Beam Melting for Rapid Prototyping of Ti6Al4V Alloys," Ph.D. Dissertation, North Carolina State University, 2012.
Z. C. Eckel, C. Zhou, J. H. Martin, A. J. Jacobsen, W. B. Carter, and T. A. Schaedler, "Additive manufacturing of polymer-derived ceramics," Science, 351(6268):58-62, 2016.
Maxim Shusteff, Robert M. Panas, Johannes Henriksson, Brett E. Kelly, Allison E. M. Browar, Nicholas X. Fang, and Christopher M., "Additive Fabrication of 3D Structures by Holographic Lithography," Proc. of 27th Int. Solid Freeform Fabrication Symp., 2016, pp. 1183-1192.
H.S. Carslaw and J.C. Jaeger, Conduction of Heat in Solids, Oxford science publications, Clarendon Press, pp. 345-347 (1986).

\* cited by examiner

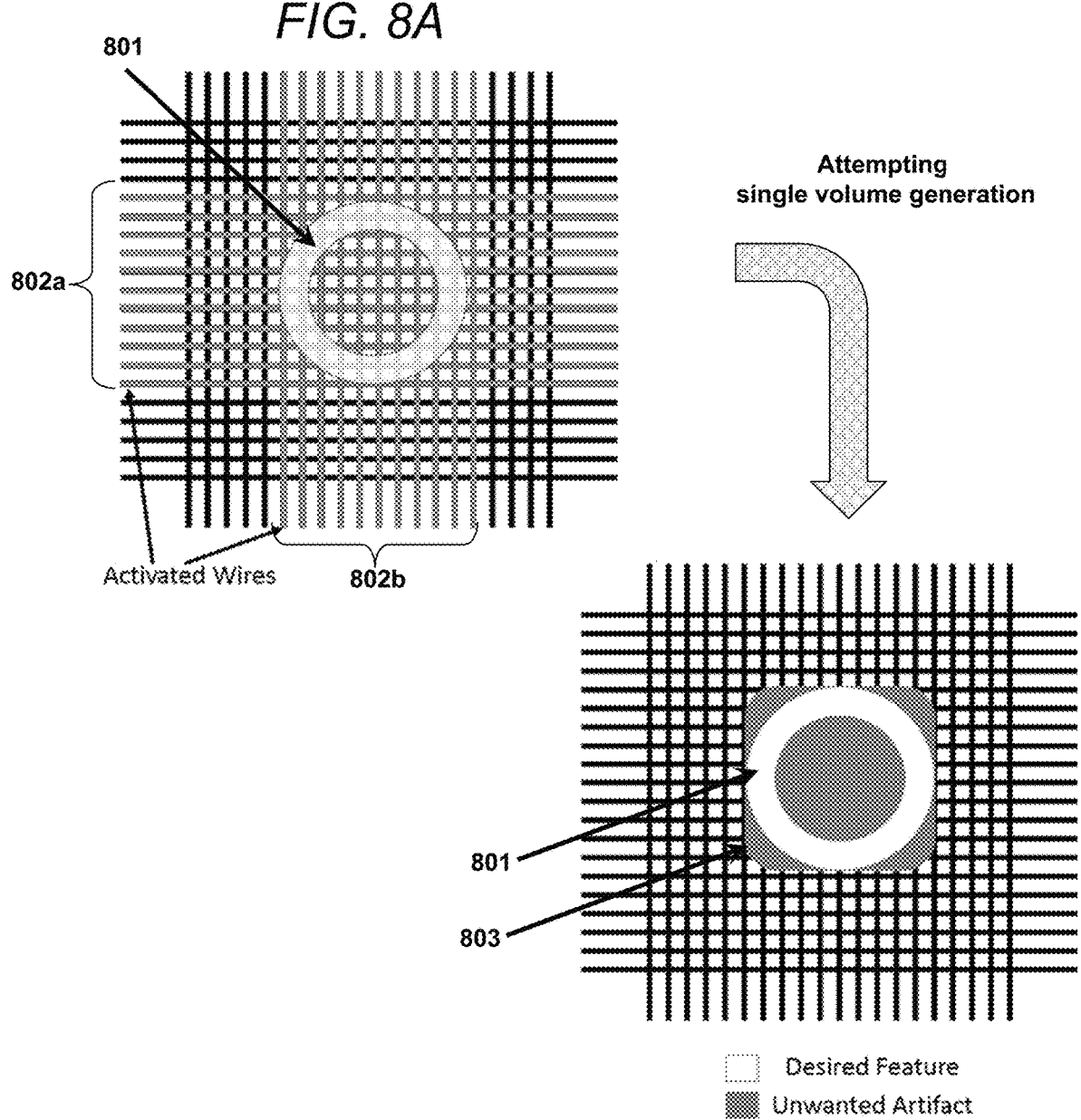

METHOD AND APPARATUS FOR VOLUMETRIC MANUFACTURE OF COMPOSITE OBJECTS

CROSS-REFERENCE

This Application is a Nonprovisional of, and claims the benefit of priority under 35 U.S.C. § 119 based on, U.S. Provisional Patent Application No. 62/451,103 filed on Jan. 27, 2017. The Provisional Application and all references cited herein are hereby incorporated by reference into the present disclosure in their entirety.

TECHNICAL FIELD

The present invention relates to the field of additive manufacturing, otherwise known as "3D printing."

BACKGROUND

The vast majority of additive manufacturing methods rely on what is often described as a "layer-by-layer" approach to producing parts of the object to be realized. In reality, these processes are actually not layer-by-layer, as each layer must be constructed from a series of linear or curvilinear paths, who are themselves constructed from a series of points. These methods therefore rely on an inherently hierarchically serial approach, where each successive portion of the object cannot be produced until previous portions are completed. Thus, utilizing these approaches amounts to constructing three-dimensional objects serially, a single point at a time.

Existing additive manufacturing processes typically require several components including:

(1) A virtual representation of some predetermined geometry to be fabricated;

(2) Some algorithmic means for discretizing that geometry into respective two-dimensional layers depending on local object cross-section with accompanying "tool paths," i.e. a "slicer;" and (3) An apparatus that deposits mass and/or energy locally that takes advantage of some material transformation, in a spatially resolved and controlled manner according to the calculated tool paths.

Integration of these three components enables the hierarchical point-by-point, path-by-path and layer-by-layer building of a generalized geometry used in current techniques.

FIGS. 1A-1C depict aspects of three illustrative additive manufacturing processes in accordance with the prior art. The dominant techniques currently in use include those that are based on deposition techniques such as Fused Deposition Modeling (FDM), aspects of which are illustrated in FIG. 1A; those that are based on sintering techniques such as Selective Laser Sintering (SLS), aspects of which are illustrated in FIG. 1B; and those that are based on photo-activation techniques such as stereolithography, aspects of which are illustrated in FIG. 1C. All of these techniques rely on the use of a point-by-point paradigm for realizing physical objects from virtual models, and are inherently serial in nature since successive paths and/or layers may only be produced after the preceding ones are completed.

For example, FDM, described in U.S. Pat. No. 5,121,329 and illustrated in FIG. 1A, typically relies on the use of polymer filaments which are extruded through a heated orifice to soften the material above its glass transition temperature, with deposition on a platform using a Cartesian mechatronic motion system to realize the path/layer geometry. Upon deposition of a material layer, the material cools, fully hardens, and adheres to the platform (in the case of the first layer) or the preceding layer (in the case of subsequent layers). However, due to the limitations of polymer materials, the mechanical performance for most FDM-produced components is not sufficient for application in mechanically demanding environments. In addition, the planar spatial resolution for this process is typically on the order of 200 um, and so this process is not suitable for making fine-scale features. Although there have been some efforts at using metal wire filaments to generate metal objects, the temperature requirements for melting metals is significantly higher than for polymers, and the atmospheric control needed to avoid deleterious oxidation have resulted in a reduced use for most commercial and consumer applications.

SLS processes, described in U.S. Pat. No. 4,863,538 and illustrated in FIG. 1B, are based upon using lasers to locally melt or sinter polymer or metal powder precursors in order to create cross-sections for layer-wise three-dimensional object creation. The ability of this process to create metallic components has facilitated its adoption across a much wider range of industries and applications. It exhibits the fine spatial resolution enabled by its use of a laser source, while also maintaining its ability to produce components with far greater mechanical performance than FDM or stereolithography (described below), due to its ability to process a wider range of material systems. However, as the melting or sintering process occurs relatively rapidly, the resulting components created tend to exhibit many types of micro, meso, and macro-scale flaws, including significant degrees of porosity, microstructural defects, residual stress, cracks, and warpage. These flaws result in components whose performance is significantly degraded relative to their fully dense/traditionally fabricated counterparts. Post-processing steps are also frequently required before objects can be employed in a functional manner. A related technique, known as Electron Beam Melting (EBM) functions in a manner virtually identical to SLS, except for the use of an electron-beam energy source (in vacuum) instead of a laser. See Alderson Neira Arce. *Thermal Modeling and Simulation of Electron Beam Melting for Rapid Prototyping of Ti6Al4V Alloys*. Ph.D., North Carolina State University, 2012.

Stereolithography, described in U.S. Pat. No. 4,929,402 and illustrated in FIG. 1C, uses lasers to photopolymerize and harden photocurable liquid resins in order to build three-dimensional objects, again through a layer-by-layer approach. A major advantage of stereolithography is that its resolution is far greater than FDM, as it is limited primarily by the laser spot size and thermo-viscosity of the liquid, allowing the creation of much finer features with greater fidelity. The drawback of this method is that the material systems in which it can be used are extremely limited and do not exhibit sufficient mechanical performance for most structural applications, though there have been recent efforts using pre-ceramic-based polymers that are photo-activated, resulting in ceramic parts that have superior properties to those manufactured using common photopolymers. See Z. C. Eckel, C. Zhou, J. H. Martin, A. J. Jacobsen, W. B. Carter, and T. A. Schaedler, "Additive manufacturing of polymer-derived ceramics," *Science,* 351(6268):58-62, 2016.

It is also noted that while the common techniques described above adhere to an ultra-serialized approach, a point by point building of an object, there have been efforts at generating objects in a truly layer-by-layer fashion. The so-called "Continuous Liquid Interphase Printing" (CLIP) process, described in U.S. Pat. No. 9,360,757, employs the time-varying projection of a two-dimensional image on a continuous, vertically translating build platform to photopolymerize cross-sectional layers for subsequent object creation. Another technique for creating objects through true section-wise construction is the so-called "laser decal transfer" process described in U.S. Pat. No. 8,728,589, which utilizes high viscosity "nano-inks" that can preserve the geometry of the laser beam used to propel a portion of material on to a substrate for building objects, typically at micron to millimeter scales. Finally, recent work detailed in Shusteff et al. ("Additive Fabrication of 3D Structures by Holographic Lithography," *Proc. of 27th Int. Solid Freeform Fabrication Symp.*, 2016) demonstrated the ability to use holographic lithography to create entire objects simultaneously. However, the maximum object sizes are limited to less than 1 cm, and suffer from the same material limitations as those described for use in stereolithography.

The resulting multi-scale stratification of mass and accompanying complex thermal histories introduced by such hierarchical processes have significant problems with respect to scaling and build times, as well as introducing weaknesses such as structural anisotropy, microstructural defects, mesoscopic deficiencies, and macroscopic geometric deviations in the resulting objects.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a method and apparatus for manufacturing three-dimensional physical objects (often referred to as "intended objects") from a precursor material based on plans, specifications, or virtual models. In accordance with the present invention, one or more locations upon the surface or within or outside the volume of the intended object can be simultaneously addressed and three-dimensional volumetric regions of the intended object can be simultaneously formed by controlling the energy distribution in an ultra-parallelized and/or staggered fashion within or outside the intended object's volume and/or its surface in order to cause some alteration in the state or form of the material at multiple locations thus directly producing an intended physical realization of geometric form.

An apparatus for manufacturing three-dimensional physical objects in accordance with the present invention can include a build domain comprising a bounded three-dimensional wire grid made by orthogonally arranging multiple layers of parallel wires in which the wires are connected to one or more power sources configured to addressably and controllably provide power to one or more individual wires resulting in resistive heat dissipation due to the Joule effect from the wire(s) into the surrounding build domain. The addressability and controllability of any and all wires thus allows for control over the three-dimensional temperature distribution within the build domain. By activating and deactivating one or more predetermined subsets of the wires in the build domain, the precursor/raw material can be caused to melt and/or solidify so as to form a three-dimensional object of desired geometry within the build domain.

BRIEF DESCRIPTION OF THE DRAWINGS

FIGS. 8A and 8B are block diagrams illustrating aspects of three-dimensional object realization in accordance with the present invention.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a method and apparatus for creating three-dimensional objects based upon virtual representations in an additive manner. However, unlike prior approaches which rely on point-by-point or layer-by-layer deposition of material to form the three-dimensional object, the method of the present invention creates three-dimensional objects directly via the fully simultaneous or partially parallel staggered generation and composition of large constituent volumes.

Figure 1A:
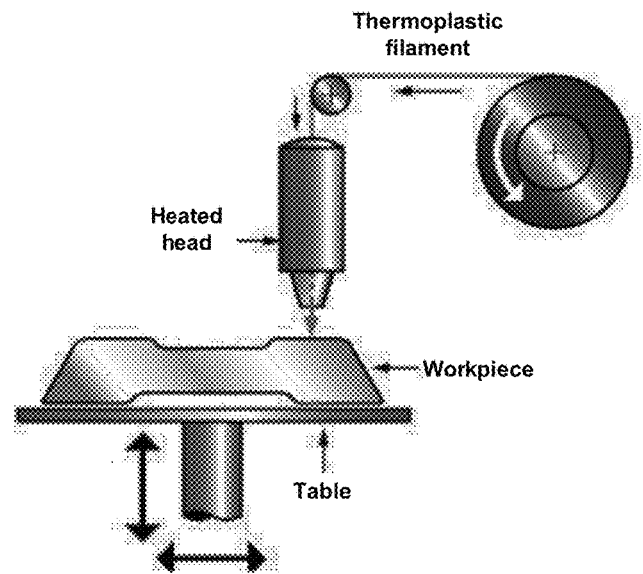
FIGS. 1A-1C are block diagrams illustrating aspects of three exemplary approaches to additive manufacturing according to the prior art.
Figure 1B:
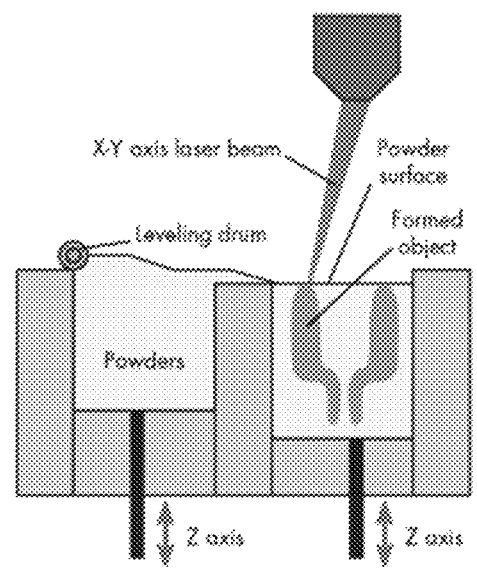
Figure 1C:
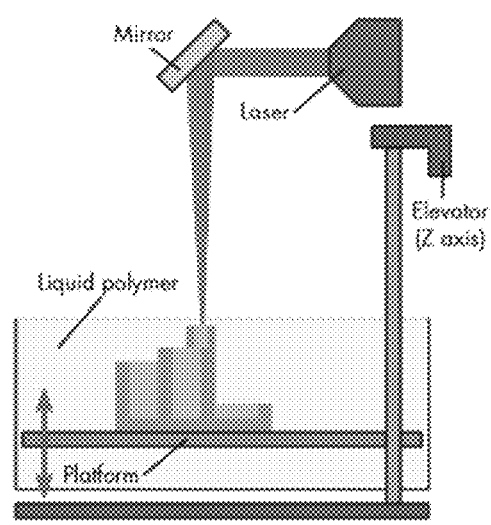
Figure 2A:
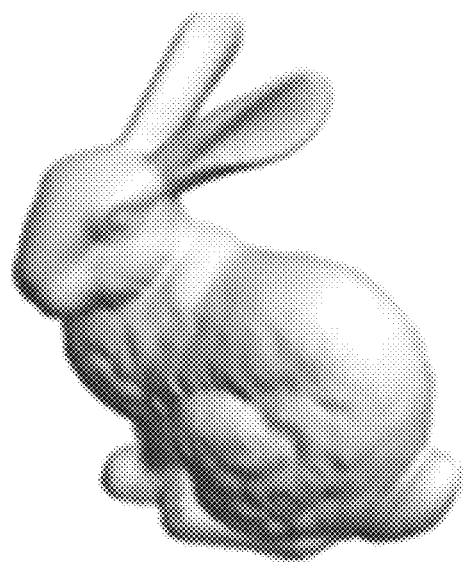
FIGS. 2A-2C are schematics illustrating conceptual aspects of a method for three-dimensional object realization in accordance with the present invention.
Figure 2B:
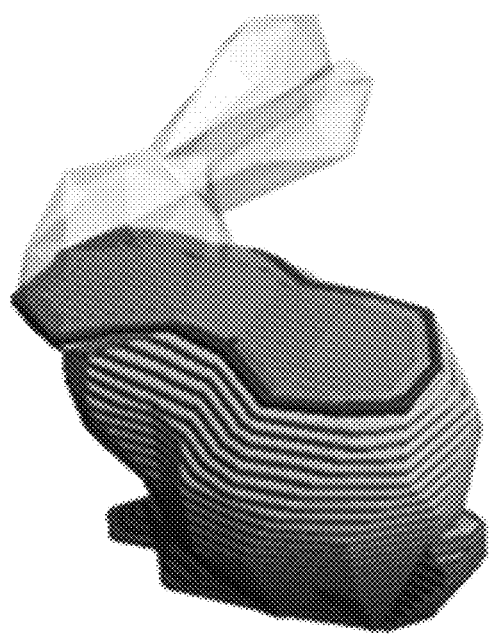
Figure 2C:
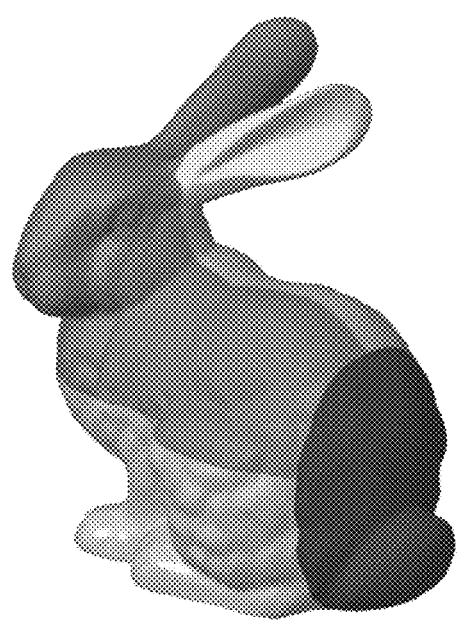

FIGS. 2A-2C illustrate aspects of the differences between the prior art methods for creating three-dimensional objects and the method of the present invention. FIG. 2A depicts a virtual representation of an arbitrary geometric model of an object to be formed, in this case, the "Stanford Bunny" well-known in the art. FIG. 2B illustrates the same Bunny which has been discretized into a plurality of point-wise paths and layers as would be done for formation of the Bunny using conventional additive manufacturing techniques, while FIG. 2C illustrates an exemplary way in which the Bunny can be discretized into a set of volumetric regions in accordance with the present invention, where the shape, dimensions and orientations of the volumetric elements are determined based upon the geometry of the object, the constraints of the specific form of the method to be employed, and the object's ultimate function.

As described in more detail below, instead of building an object point-by-point, in an intrinsically serial process as in the prior art, the method of the present invention allows for the building of an object by one or more volumetric regions of varying geometries and sizes, where each respective volumetric region is created all at once and multiple independent volumetric regions can be realized simultaneously. By doing so, the present invention provides a significant improvement in build speed, build time scaling behavior (with respect to object size), and efficiency relative to prior techniques.

The method of the present invention relies on the ability to control the distribution of energy (thermal, electrical, electro-magnetic, light-based, chemical, electro-chemical, acoustic, etc.) throughout the volume of an enclosed "build domain" which contains the precursor material to be processed in order to create the object, where the precursor material can take any appropriate form including powders, liquids, solids, gases, plasmas, etc. depending on the specific implementation of the method being made. For example, the precursor material can be in the form of a polymer powder, a metal powder (either pure metals or alloys), a nanoparticle powder (monolithic, core/shell, functionalized, etc.), or a ceramic powder. In other cases, the precursor material can include a shape memory material, magnetic material, or a semiconductor materials, while in still other cases, the precursor material can be in the form of composite precursor systems such as polymer/metal, polymer/ceramic, or metal/ceramic material systems.

In accordance with the present invention, by spatially and temporally controlling the volumetric distribution of energy within the build domain, the precursor material can be processed/altered in a predetermined spatially resolved manner to create a desired three-dimensional object from the precursor material. The control of energy within the build domain can also permit the generation of such discrete volumetric regions from the precursor material through other suitable means such as phase transformation, sintering, photoactivation, thermal curing, surface pressure induced bonding, electro-deposition, etc.

The process of the present invention can be accomplished using a novel apparatus which allows for the simultaneous creation of one or more three-dimensional volumetric regions of an object to be realized by controlling the volumetric distribution of energy within the processable build domain.

Controlling the volumetric distribution of thermal energy (i.e., heat) within the build domain may be accomplished by leveraging any one of several physical phenomena. In an exemplary embodiment described herein, the volumetric distribution of energy within the build domain is controlled through the use of controlled local heat generation resulting from electrical current flow and resistive heat dissipation through an electrical element. In other embodiments, the volumetric distribution of energy within the build domain can be controlled via, e.g., acoustic means; electromagnetic means (e.g. inducement of current density under the presence of electric and/or magnetic field that activate Joule heating according to Pointing theorem); or electrochemical, photo-thermal, or direct photo-activation (e.g. fiber-optic delivery) means.

Figure 3A:
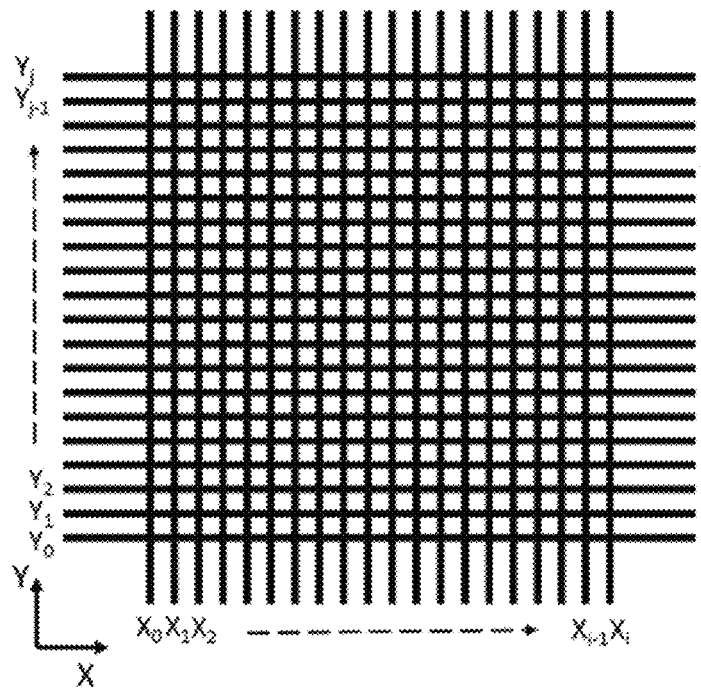
FIGS. 3A and 3B are block diagrams illustrating aspects of an apparatus and method for three-dimensional object realization in accordance with the present invention.

The schematics in FIGS. 3A/3B and 4A/4B illustrate aspects of an apparatus that can be used to produce one or more volumetric elements in an object to be realized in accordance with the present invention. In the embodiments illustrated herein, the wires are shown as being linear, with the wires located in the same layer (neutral axes sharing Z-coordinate) being parallel, and being mutually orthogonal (about the Z-axis) to those in adjacent layers. However, one skilled in the art will understand that in other embodiments, other wire arrangements may be possible, and all such other embodiments and arrangements are deemed to be within the scope of the present disclosure.

Figure 3B:
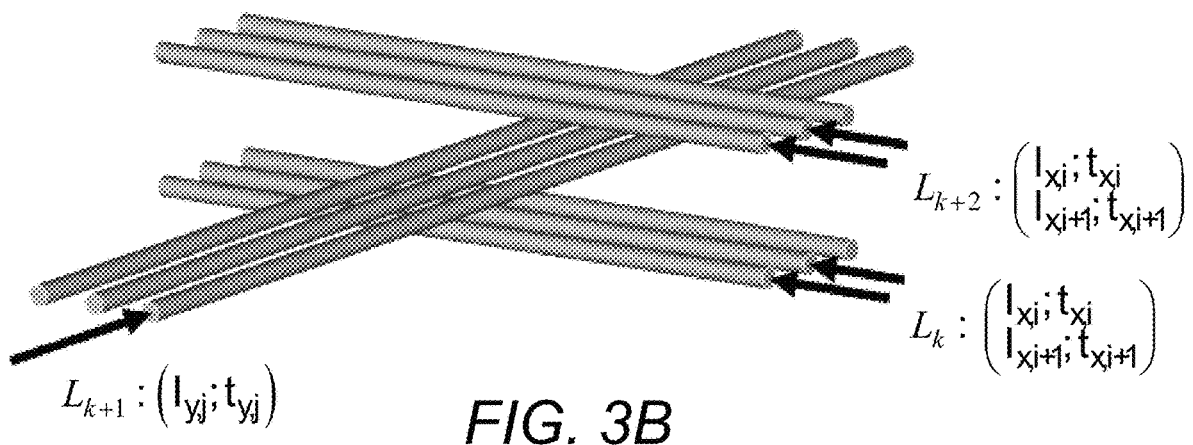

As illustrated by the block schematics in FIG. 3A and FIG. 3B, the apparatus comprises a plurality of wires spaced at some distance relative to each other. Wires within a single layer, i.e. wires whose longitudinal axes lie within the same XY plane, are parallel, and thus proceed along the same direction. For simplicity, it can be stated that the base layer (e.g., $Z_0$ shown in FIG. 4A) consists of i wires whose longitudinal axes are parallel with the X-axis as defined in FIG. 3A. In the illustrated embodiment, each subsequent layer comprises wires whose longitudinal axes are orthogonal (rotated 90 degrees about the Z-axis) relative to those in the preceding layer. For example, the layer following the base layer ($Z_1$) consists of parallel wires oriented in the Y-direction. This pattern of orthogonality proceeds for all subsequent layers. One skilled in the art will readily recognize, however, that other configurations of the wires are possible. For example, in an alternative embodiment, the wires within a layer may be parallel to each other, but are rotated less than 90 degrees (e.g., 45 degrees) from the wires in an adjacent z-layer, where such an arrangement of wires may be advantageous from a structural point of view.

Figure 4A:
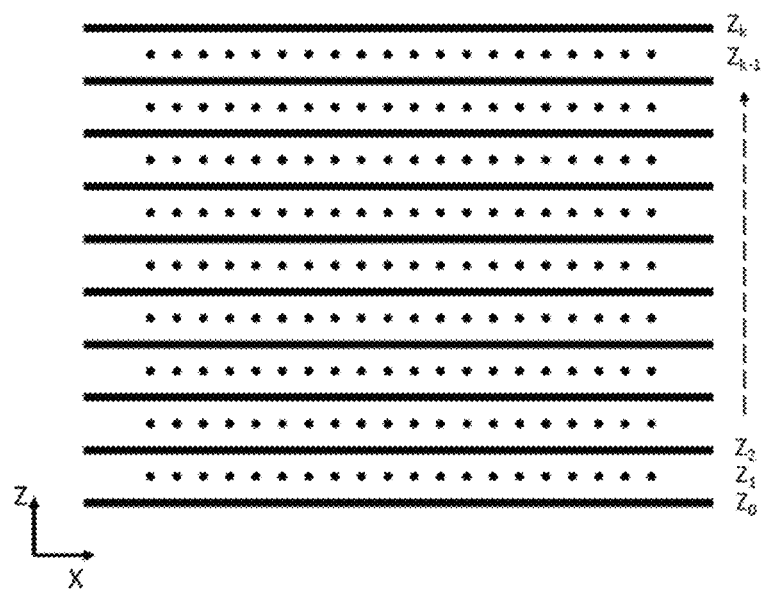
FIGS. 4A and 4B are block diagrams illustrating aspects of a wire grid and build domain used in an apparatus for three-dimensional object realization in accordance with the present invention.
Figure 4B:
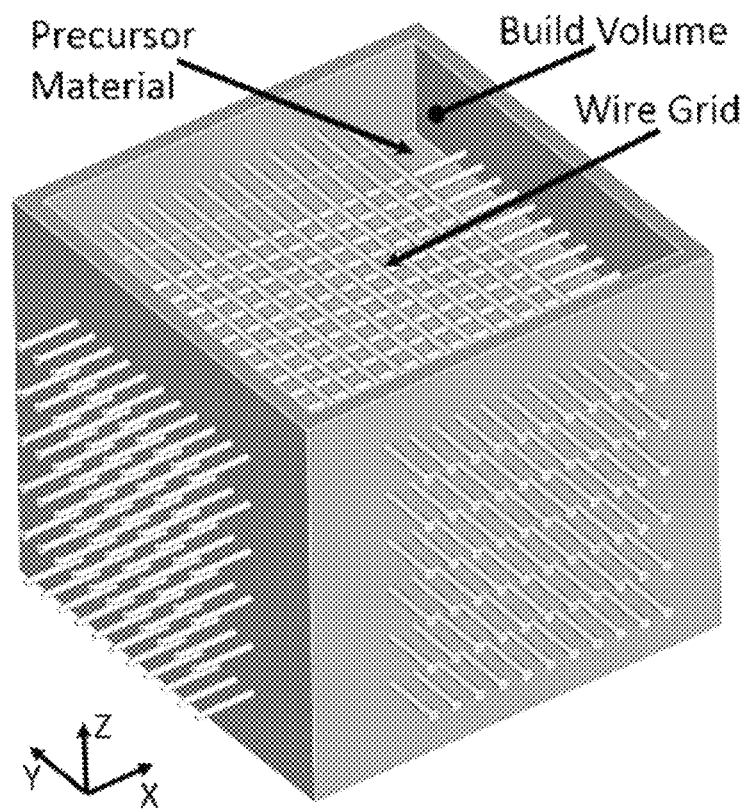

The schematic in FIG. 4A further illustrates this alternation of the x and y wire arrangements, and shows how they are "stacked" along a third direction orthogonal to both the x and y axes, e.g., along a "z" axis as shown in FIG. 3B, to form a three-dimensional wire grid structure comprising a series of layers $z_0$, $z_1$, $z_2$, . . . $z_{k-1}$, $z_k$ of x-oriented and y-oriented wires. This three-dimensional structure forms the basis for the build domain illustrated in FIG. 4B, which includes the wire grid structure situated within a precursor material, bounded by a solid structure.

The build volume is filled with precursor material, i.e. the "raw" material used for object production in powder form. This precursor material occupies the available volume within the build domain, most notably in the interstices between the wire grid described above.

The apparatus also can include a means for positioning the wires relative to each other in three-dimensional space (relative distance and orientation), as well as controlling for their levels of tension. For example, each layer of wires (or individual wires) may be coupled to, for example, a manually controlled or electrically driven actuator/positioner for fine control over wire pitch (center-to-center) and/or tension in the wires.

In addition, as described in more detail below, the apparatus can also include an electrical power supply and electronic control system or other suitable apparatus configured to controllably deliver a predetermined amount of power and energy to each wire independently.

As noted above, the operating volumetric region bounded by the outer structure, where the wires are situated, and over which the three-dimensional temperature distribution is controlled, defines the build domain. The extents of the build domain are dictated by the distance set between wires, the total number of wires within a layer, and the total number of layers. Within the build domain, the spaces between the wires are occupied by the precursor material to be used to create the intended three-dimensional object.

Each of the wires is connected to a source of electrical current where the source is configured such that the state (on or off) as well as the amount of current through each wire is individually controllable and addressable. The passage of electrical current through a wire results in local heat generation due to the Joule effect throughout the wire, and produces a transfer of that heat to the surrounding precursor material. The three-dimensional, time varying temperature field resulting from that heat dissipation can be found through the solution of the non-equilibrium, classical heat equation:

$$\frac{dT}{dt} - \kappa \nabla^2 T = \dot{Q}_v(x, y, z, t) \quad (1)$$

where T, l, κ and $\dot{Q}_v$ are the temperature, time, thermal diffusivity, and volumetric heat generation rate, respectively.

If electrical current is passed through more than one wire, either simultaneously or with some time delay, the time varying three-dimensional temperature fields produced by each active wire will interact with one another so as to produce a larger scale temperature field within the build volume. The total resulting temperature field may be computed by simply summing the contributions of each wire:

$$\dot{Q}_v(x,y,z,t) = \Sigma_{l=1}^{N} P_l \quad (2)$$

where $P_l$ is the $l^{th}$ wire. The $l^{th}$ wire can be also indexed using k along the Z axis of the wire grid setup and i and j along the x and y directions, respectively, as shown in FIGS. 3A, 3B, 4A, and 4B discussed above. Thus the fact that the spatio-temporal distribution of heat may be altered by the superposition of multiple independent wires (power sources) allows for the local control and amplification of temperature.

Figure 5:
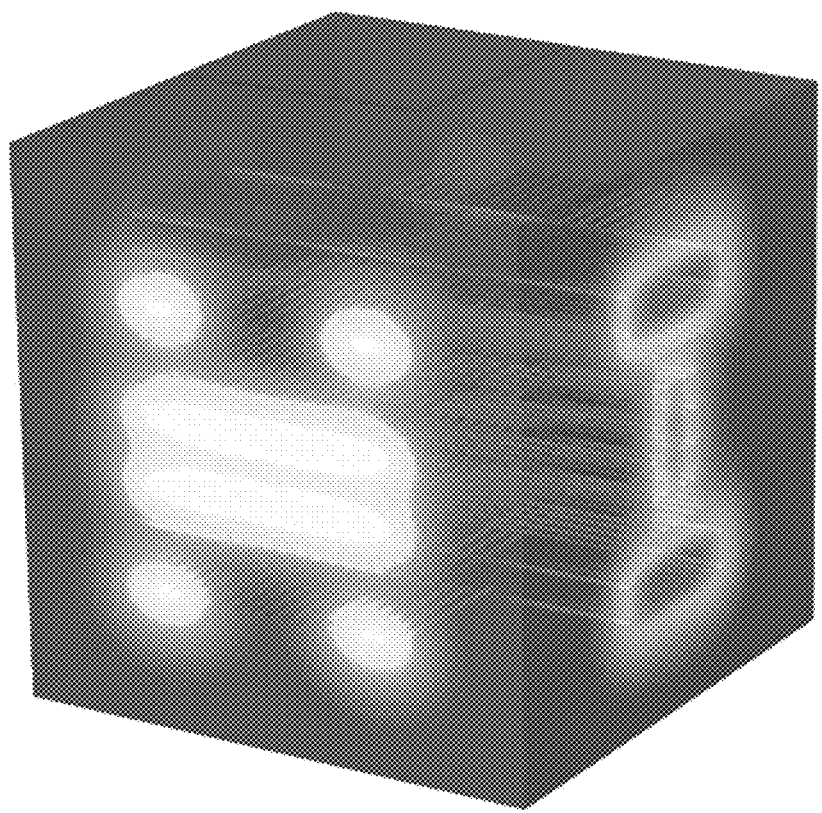
FIG. 5 is a block diagram illustrating a simulated three-dimensional temperature field in a volume due to the activation of selected wires in a volumetric domain for three-dimensional object realization in accordance with the present invention.

FIG. 5 illustrates this aspect of the present invention, and shows a finite element simulation of multiple wires in a build domain in accordance with the present invention being activated and dissipating heat as a result, demonstrating that the temperatures within the build domain can vary spatially according to the electrical power applied to the various wires in the domain. As described in more detail below, the present invention makes use of this phenomenon to produce volumetric elements from the precursor within the build domain.

Thus, in accordance with the present invention, in volumetric regions where the temperature meets or exceeds some material-dependent threshold, the form or state of that material can be altered in some manner. For example, if the precursor material is a polymer (powder), metal (powder), or ceramic (powder), in locations in the build domain where the precursor's melting or sintering temperature is met or exceeded, the material occupying that region partially or fully melts, while the material in locations where the melting/sintering temperature is not met, simply remains in unconsolidated precursor (powder) form. In other cases, e.g., where the precursor material is a liquid thermoset prepolymer, temperature field manipulation in accordance with the present invention can result in locally controlled curing and hardening of that region of the material that meets the curing temperature requirements.

Figure 6A:
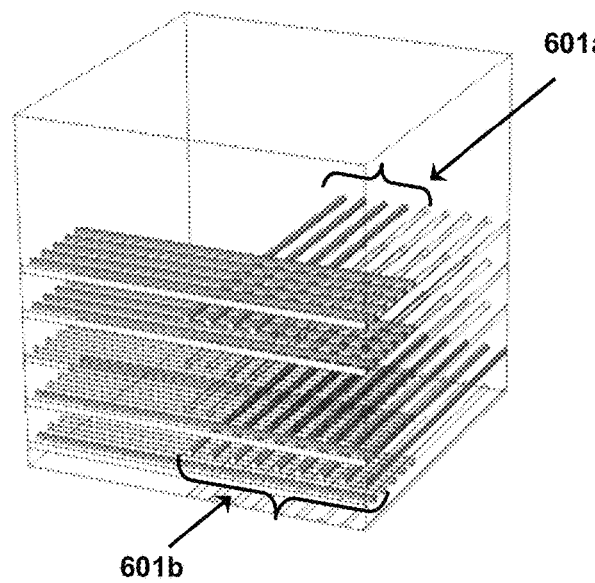
FIGS. 6A-6C are block diagrams illustrating exemplary spatial schemes for activation of selected wires in an apparatus for three-dimensional object realization in accordance with the present invention.
Figure 6B:
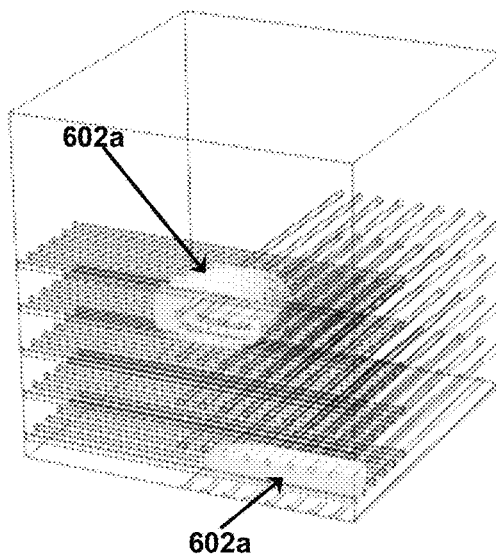
Figure 6C:
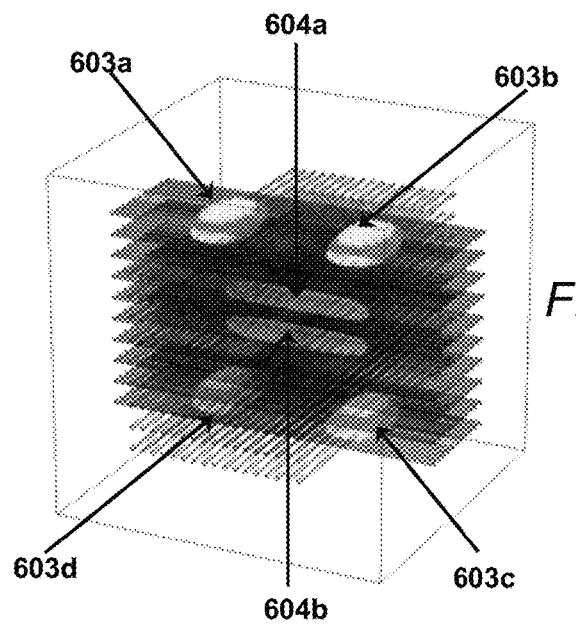

The block schematics in FIGS. 6A-6C illustrate the results of a thermal finite element simulation of the effect on a precursor in an exemplary build domain when one or more of the wires in the domain are activated in accordance with the present invention. FIG. 6A shows a simulated region of an exemplary build domain in which wires 601a and 601b are activated for use. FIG. 6B illustrates the temperature isosurface results of the wires activated in FIG. 6A, while FIG. 6C shows the complete build domain after the wires have been activated, and shows a melt temperature isosurface of the precursor material representing the geometric boundary of a discrete three-dimensional volumetric element generated by local melting due to activation of specified wires and resolidification of the melted precursor.

The wires in the build domain are also operatively connected to a processor programmed with information regarding the object to be produced, such as its size, shape, and/or orientation. The processor is also operatively coupled to the power source so that the one or more predetermined subsets of the wires in the build domain can be activated/deactivated so as to form one or more volumetric regions of the object to be produced.

Thus, in accordance with the present invention and as described above, when a predetermined subset of the wires in the build domain is activated, the activated wires provide heat to melt the precursor in a predetermined volumetric region of the build domain occupied by the activated wires. When those wires are deactivated, the thus-applied heat is no longer provided to the build domain, and the precursor material cools and re-solidifies, resulting in the formation of a now-discrete volume of material that differs in form and structure from the surrounding precursor material whose temperature did not meet or exceed the threshold. By controlling the three-dimensional geometry of the temperature field through activation and control of one or more predetermined sets of wires, discrete three-dimensional regions of altered material having predetermined volumetric geometries can be produced. By producing multiple volumes comprising the complete object and linking them at their respective interfaces, a physical realization of the entirety of the virtual three-dimensional object can be achieved.

Alternatively, by activating/deactivating multiple predetermined sets of wires in the build domain, multiple distinct objects can be simultaneously formed within the same build volume. This can be seen in FIGS. 6B and 6C, which show multiple independent volumetric elements (602a/602b in FIG. 6B and 603a/603b/603c/603c and 604a/604b in FIG. 6C) being simultaneously formed through the activation/deactivations of different sets of wires in the domain.

The wire grid in the build domain in accordance with the present invention provides numerous additional benefits over the prior art. In addition to producing the geometry of the complete object based on their selective activation/deactivation, the wires in the build domain remain embedded within the object, with excess wire outside the bounds of the object's geometry being removed in a post-processing step. The presence of these embedded wires within the object can act to reinforce its structure, with the object and the embedded wires essentially acting as a composite structure, allowing for significantly enhanced mechanical strength to weight ratios within the object. The tension on a predetermined subset of the wires in the build domain can also be controlled such that the post-build stress state is advantageous with respect to its intended use, such as in fatigue applications, similar to the way in which rebar is used in pre-stressed structural concrete sections. The wires left within the object can also be tailored to provide predetermined thermal, electrical, photonic, or electromagnetic responses within a composite material forming the object. In addition, the flexibility of the process in accordance with the present invention permits the orientation of the wires to be tailored based on the final object's geometry and intended use, which can be highly useful for objects having an intended function where an anisotropic object would be desirable.

In other aspects, the present invention also provides a process for three-dimensional object realization using selective activation of a three-dimensional wire grid in an apparatus such as that described above.

Figure 7:
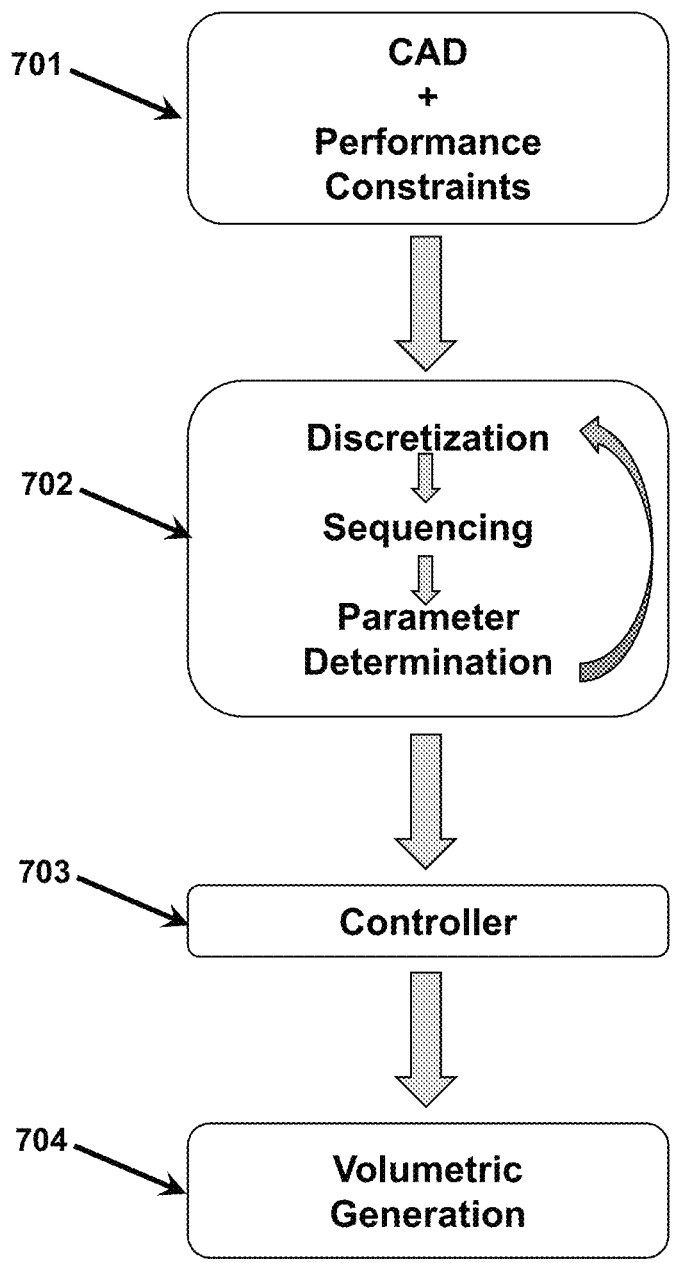
FIG. 7 is a schematic illustrating an exemplary process flow in a method for three-dimensional object realization in accordance with the present invention.

The overall process is illustrated by the process flow diagram shown in FIG. 7.

As illustrated in FIG. 7, the process begins at step 701, wherein a virtual representation of the object to be produced is made, e.g. via CAD. At this step, performance constraints, such as those that that may affect how the object performs in use, are also identified. All of this information is entered into a processor that is operatively coupled to the build domain apparatus described above.

At step 702, as described in more detail below, the virtual representation of the object is iteratively volumetrically discretized into a plurality of large constituent volumetric sub-regions by a processor programmed with appropriate software. At this step, the process parameters for the build (e.g., the wires in the build domain to be activated, current to be supplied to specified wire(s), and on/off times for the current) for each discrete constituent sub-volume of the object to be produced also will be determined by the processor based on, e.g., the characteristics of the object to be produced and the constituent volumetric sub-regions of the discretized virtual object. At step 703, the thus-determined process parameters are then input into a controller that is operatively coupled to the wires, and at step 704, based on those process parameters, the wires are activated/deactivated by the controller in a manner described above to generate one or more solid volumetric elements within the build domain.

Ideally, the desired component could be created via the production of a single volume, i.e. a single volumetric region coinciding with the geometry of that object. Although there may be cases where this is achievable (e.g. a cube), in most cases, however, this will not be possible.

The block diagrams in FIGS. 8A and 8B illustrate why it will usually not be possible to produce the desired object via the production of a single volume. For example, as illustrated in FIG. 8A, it may be desired to form an object such as ring 801 by activating/deactivating wires 802a/802b within the build domain. However, as illustrated in FIG. 8B, due to the geometry of the activated/deactivated wires, activation/deactivation of the wires also results in the formation of one or more unintended volumetric regions 803 inside and/or outside the ring.

To avoid or minimize the generation of such unwanted excess volumetric regions, in accordance with the present invention, in many cases, the desired object geometry can be subdivided into multiple constituent sub-volumes. In accordance with the present invention, a predetermined subset of the wires can be activated/deactivated to produce such a sub-volume. In some embodiments, the wires in a plurality of sub-volumes making up the desired object can be controllably activated/deactivated simultaneously to form part of all of the desired object at once from the plurality of volumetric elements, while in other embodiments, the wires in one or more sub-volume can be activated/deactivated in a predetermined sequence to form the desired object. In other cases, multiple objects, defined by one or more constituent sub-volumes within the build domain, can be produced either sequentially or simultaneously by activating/deactivating the wires corresponding to their respective constituent sub-volumes.

One of many possible approaches is to discretize the full geometry into sub-volumes solely of right-rectangular parallelepipeds, from here forward termed "boxels." Although other sub-volume geometries may be used, the use of parallelepiped boxels benefits from its geometric simplicity, flexibility and relative ease of implementation. Use of parallelepiped boxels is also compatible with the manner in which the sets of wires are oriented, i.e. linear, parallel and mutually orthogonal to each other in terms of adjacent layers in the Z direction.

The subdivision of the desired input into boxels ("boxelization") can be accomplished through the use of any suitable algorithm, where the choice of boxelization algorithm depends upon factors such as the intended function of the object to be manufactured, the properties of the production device, or other outside factors such as a desire to tailor the number of boxels based on a particular production time.

Figure 9A:
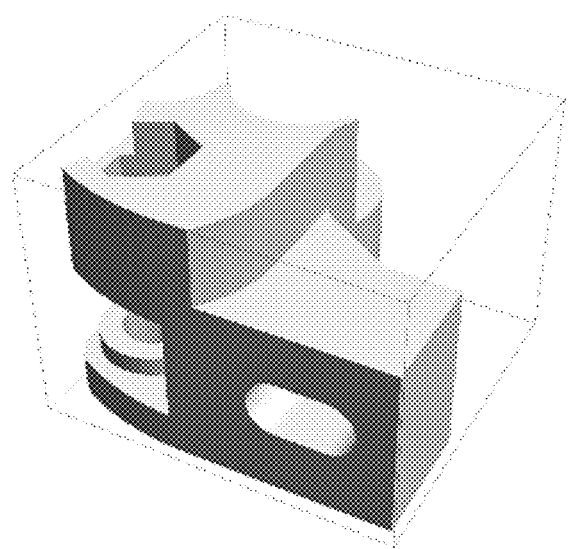
FIGS. 9A-9C are block diagrams illustrating aspects of "boxelization" procedures used in a method for three-dimensional object realization in accordance with the present invention.
Figure 9B:
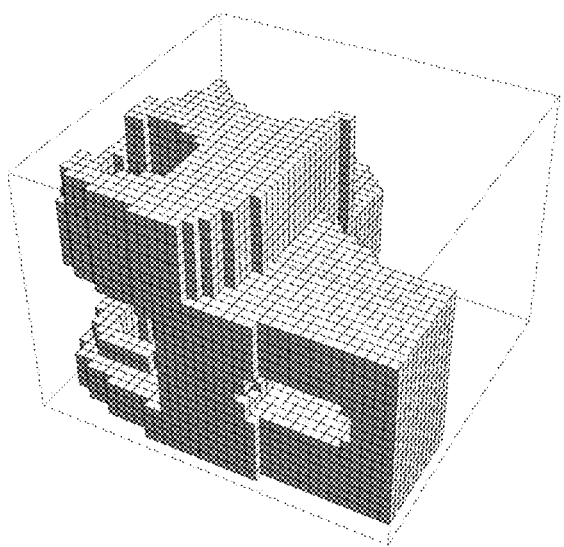
Figure 9C:
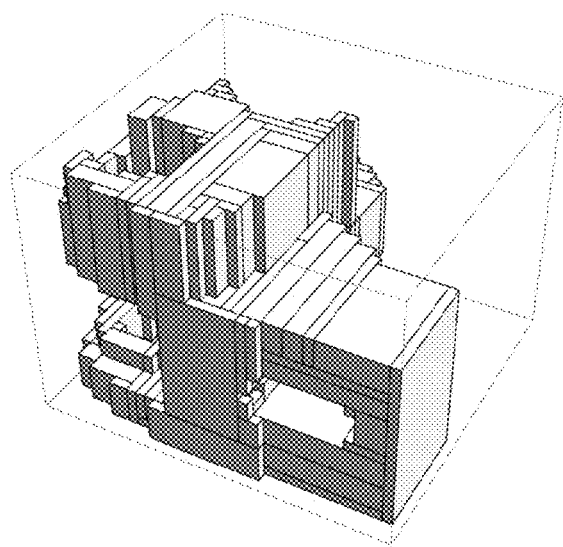

The block schematics in FIGS. 9A-9C demonstrate an exemplary boxelization method that can be used in the method of the present invention. In most cases, this boxelization will be accomplished by means of a processor that applies the boxelization to the virtual representation of the object to be produced, with the results of the boxelization being input into the processor controlling the activation/deactivation of the wires in the build domain in a manner described above.

FIG. 9A depicts the initial geometry of a solid three-dimensional object to be produced using the volumetric production process in accordance with the present invention. As shown in FIG. 9B, this initial geometry is subdivided into a plurality of cubic volume elements (conventionally known as "voxels"). Once the voxels are identified, a boxel can be initialized, where the initialized boxel consists of a single arbitrarily chosen voxel which acts as a "seed." The neighbors of the initial boxel are then queried, and if a single adjacent voxel (or combination of multiple adjacent voxels) can be added to the boxel while maintaining the geometry of a right-rectangular parallelepiped, then those voxel(s) are incorporated into the boxel to "grow" the initial boxel into a larger one comprising multiple voxels. This process is repeated until no neighboring voxels are eligible for inclusion into the grown boxel, and at that point, the voxels which have been incorporated into the boxel are removed from further consideration. A remaining voxel is then chosen as the seed for the next boxel, and the entire process is repeated until no voxels remain.

It should be noted that this method for boxelization is exemplary only, and other methods by which subdivision of a virtual object for volumetric manufacturing may be employed, with such different algorithms producing with more (or fewer) boxels from the same input. Other boxelization methods may be used as appropriate to achieve different functional performance specifications (e.g. wear resistance, thermal insulation, or electrical conductivity). In addition, other extensions or adaptations of the boxelization method are also possible. For example, one trivial extension might be the allowance for overlapping boxels in order to achieve increased mechanical strength.

The order in which boxels are activated should also be properly sequenced, e.g., to further reduce the total amount of time to realize a desired object. To achieve this, a sequencing algorithm can also be employed. The choice of sequencing approach may often be geometry-dependent. For example, an approach that maximizes the size of boxels (minimizes the total number of boxels) can be utilized. In other cases, depending on the object's geometry, it may be advantageous to maximize the total number of boxels that may be printed in parallel (depending on their relative positions within the object's geometry).

In addition to determining discretization and sequencing, the processor also determines the appropriate processing parameters needed to produce the desired object. These parameters are then provided to the controller so that the controller can activate the proper series of wires at the proper voltage/current levels for the proper length of time for creation of the desired object. This may be accomplished in a variety of ways, though the manner in which it is done can affect the speed of the computation. Consequently, in accordance with the present invention, a strategy based on mathematical model inversion techniques has been developed as a rapid means for determining the proper electrical current levels and "on" times for each wire in the respective boxels determined via the discretization process.

The aim of the inversion process is to identify the current level each delivery element needs to operate given an on duration. According to the solution provided in H. S. Carslaw and J. C. Jaeger, *Conduction of Heat in Solids*, Oxford science publications, Clarendon Press, pp. 345-347 (1986), the temperature at a distance r from the surface of a heated wire in an infinite medium can be estimated by $$T(r) = \frac{2A_0\sqrt{\kappa_2}}{\pi}\int_0^\infty \frac{1-e^{\kappa_1 u^2 l}J_1(ua)[J_0(\kappa u)\phi(u) - Y_0(\kappa ur)\psi(u)]}{u^3[\phi^2(u)+\psi^2(u)]} du \quad (3)$$

where $A_0$ is the heat production at a constant rate per unit time per unit volume.

The definition of the rest of the symbols can be found in Equation (3) can be rewritten as $$T(r)=A_0 f(r) \quad (4)$$

where $$f(r) = \frac{2\sqrt{\kappa_2}}{\pi}\int_0^\infty \frac{1-e^{\kappa_1 u^2 l}J_1(ua)[J_0(\kappa u)\phi(u) - Y_0(\kappa ur)\psi(u)]}{u^3[\phi^2(u)+\psi^2(u)]} du \quad (5)$$

It is obvious from Equation (3) that for each point in the domain and point in time, the temperature at that point depends linearly on the power provided. Since the thermal problem is linear, the temperature field that is produced from any number of wires is the superposition of many equations like Equation (3).

Assuming a nodal discretization of the domain of interest given by $w_p=\{x_p,y_p,z_p\}^T$, $p=1 \ldots M$, and a set of linear energy delivery elements (e.g., wires) represented as lines $L_l$, $l=1 \ldots N$, it is possible to define the distance matrix between any node p and line l as $$D = \begin{pmatrix} \varepsilon(w_1, L_1) & \varepsilon(w_1, L_2) & \ldots & \varepsilon(w_1, L_N) \\ \varepsilon(w_2, L_1) & \varepsilon(w_2, L_2) & \ldots & \varepsilon(w_2, L_N) \\ \vdots & \vdots & \blacksquare & \vdots \\ \varepsilon(w_{NM}, L_1) & \varepsilon(w_M, L_2) & L & \varepsilon(w_{NM}, L_N) \end{pmatrix} \quad (6)$$

where $\varepsilon(w_p, L_1)$ is the distance between a point represented by vector $w_p$ and line $L_1$.

If the heat production for wire $1$ is $A_{0l}$ and by using Equations (4) and (6) and the superposition principle, the temperature at each point i within the domain can be calculated using:

$$t=f(D)a, \quad (7)$$

where $$t=\{T_1,T_2, \ldots ,T_M\}^T \quad (8)$$

is a vector the collects the temperatures for the individual nodes p, p=1 . . . M, and $$a=\{A_{01},A_{02}, \ldots ,A_{0N}\}^T \quad (9)$$

is a vector the collects the heat production levels for the individual wires l, l=1 . . . N.

Equation (7) represents the forward solution of the problem of calculating the temperature anywhere in the domain of interest for given distances and heat production levels.

Given a geometry of interest it is possible to define threshold temperatures for which certain melting points are reached. In that sense Equation (7) can be considered an inverse problem with a being an unknown vector. Since the problem is overdetermined (in general N>M), the inverse problem can be solved using a least square approach as expressed by:

$$a=f^{-1}(D)t_d, \quad (10)$$

where $t_d$ is a vector containing the desired levels of temperature for each point in the domain and $f^{-1}(D)$ is the Moore pseudo-inverse of $f(D)$. This inverse can be calculated by for example using Singular Value Decomposition (SVD).

In general, because the desired temperature levels need to be consistent with the solution of the actual physical problem and at the same time the solution of Equation (9) may contain non-physical values for the heat production, it is necessary to bias the problem towards the correct solution. This can be achieved by a number of strategies including Non-Negative Matrix Factorization, biasing of temperature values using weights and employment of iterative solver on top of the inversion represented by Equation (9).

Once a (and consequently $\{A_{01}, A_{02}, \ldots, A_{0M}\}^T$) have been identified, one can calculate current requirements that drive the wires to produce the appropriate levels of heat. This calculation can be performed either based on a constant or time-varying current profile.

The present invention also includes a control system configured to provide the appropriate levels of electric current to one or more of the wires in the grid for an appropriate duration of time to produce the desired volumetric object as a consequence of the current-induced Joule heating.

Figure 10:
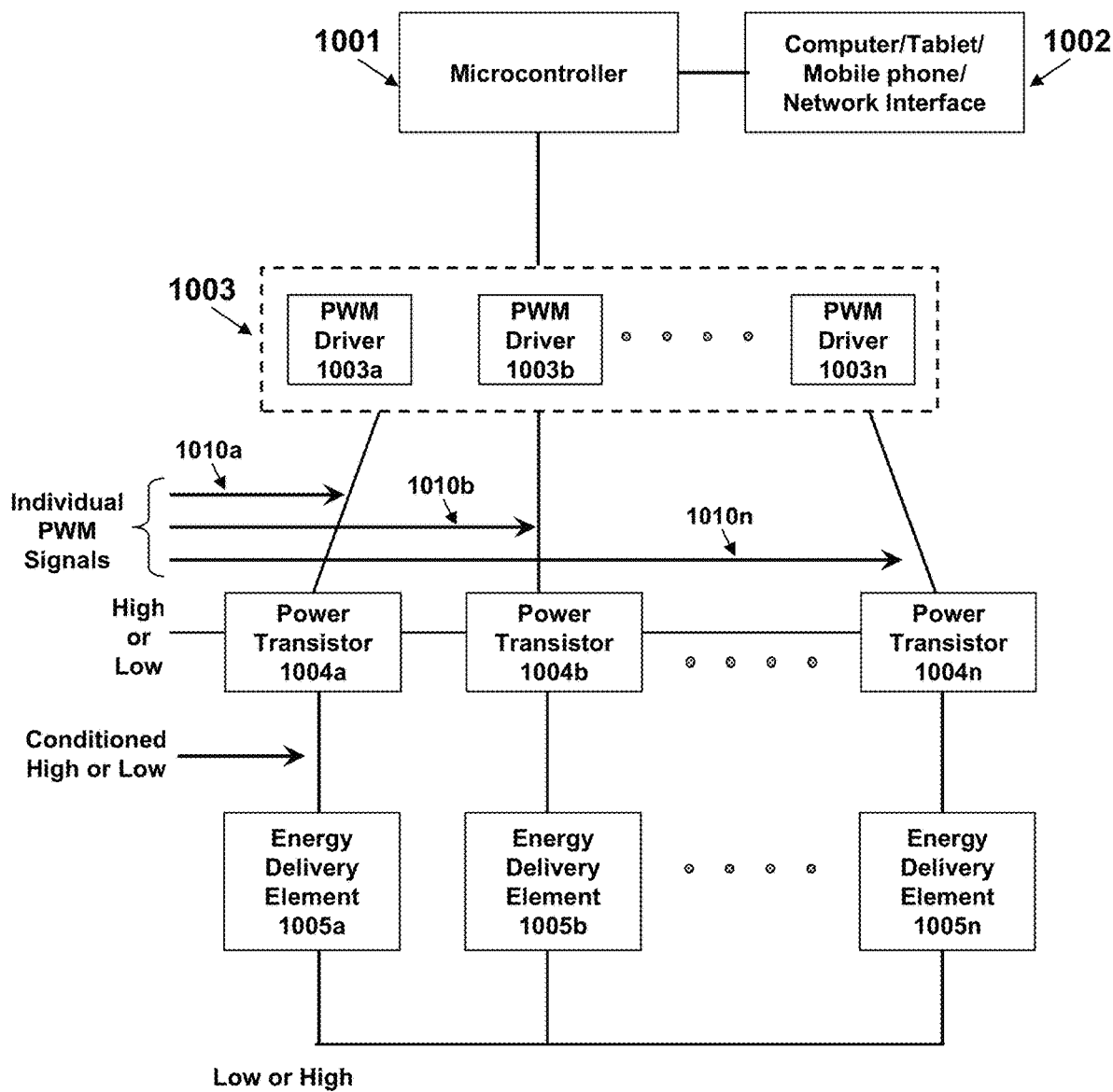
FIG. 10 is a block diagram illustrating aspects of a system for controlling delivery of energy into the wire grid in an apparatus for three-dimensional object realization in accordance with the present invention.

The schematic in FIG. 10 illustrates aspects of an exemplary embodiment of a control system that can be used to control the activation/deactivation of the wires in a build domain in accordance with the present invention. As illustrated in FIG. 10, such a control system can include a microcontroller 1001 coupled to a device 1002 that provides a user interface with microcontroller 1001, e.g., a computer, a network interface, or a mobile device such as a mobile phone or a tablet; an optional Pulse Width Modulation (PWM) driver array 1003 comprising one or more PWM drivers 1003a, 1003b, . . . 1003n; and an array of power transistors 1004a, 1004b . . . 1004n.

The control systems microcontroller 1001 generates PWM signals 1010a, 1010b, 1010n directly or through appropriate driver electronics which are fed into the corresponding gate in each power transistor 1004a, etc. Each of the power transistors in turn is coupled to a corresponding energy delivery element 1005a, 1005b, . . . 1005n, although in some embodiments, the system may be multiplexed so that only a small number of power transistors can control a large number of energy delivery elements. Depending on whether the high or low sides are controlled by the PWM, the reciprocal electrical power side will be connected to the other end of the energy element.

In accordance with the present invention, the microcontroller can individually control the PWM duty cycle for each transistor and hence individually control the level of power delivered by each delivery element. In addition, by controlling the timing of the applied power, the microcontroller can control the duration that the PWM train remains active, thus controlling the duration which any individual wire remains in an "on" or "off" state.

The microcontroller can be used in conjunction with other microcontrollers in a daisy-chain or networked fashion, in order to provide the capacity to scale up the system. This can be accomplished via a variety of communication interfaces, including but not limited to I2C, SPI, CAM, etc. The microcontroller(s) should also have a central or distributed interface to communicate with a general purpose computer. The computer can be used to provide a continuous stream or a pre-determined set of commands, that define power levels, and timing sequenced for each individual power delivery element.

Figure 11:
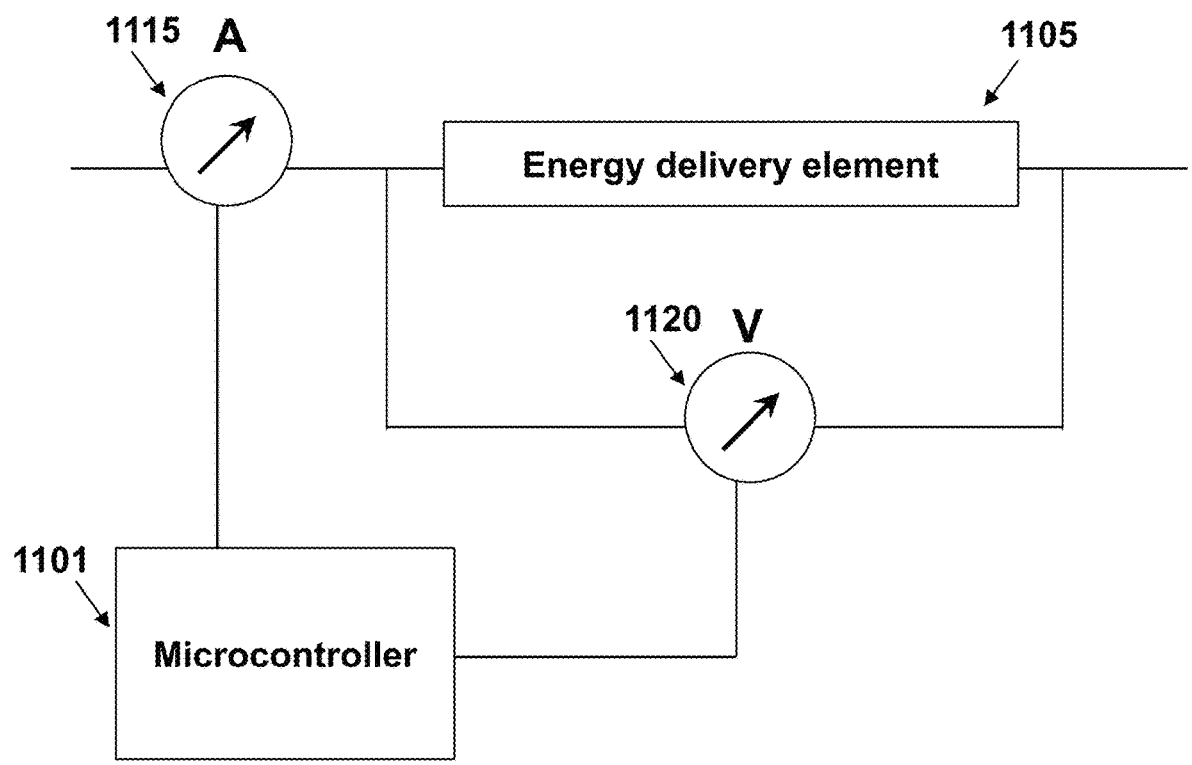
FIG. 11 is a block diagram further illustrating aspects of a system for controlling delivery of energy into the wire grid in an apparatus for three-dimensional object realization in accordance with the present invention.

In some embodiments, the energy delivery elements can be equipped with one or more sensing elements such as current and voltage sensors 1115 and 1120 shown in FIG. 11, which can be exploited for real-time, "in-the-loop" control over the three dimensional temperature distribution. This can be accomplished via the knowledge of the relationship between wire resistivity and temperature, which may be readily calibrated.

Such devices may be but are not limited to current and voltage sensors. In some embodiments, the controller can include sensors connected to the microcontroller which can provide the basis for a feedback control loop which can be used, for example, for driving current through a proportional-integral-derivative (PID) loop or for performing appropriate action upon sensing a melting of the precursor material in the build domain.

EXAMPLE 1

An exemplary prototype apparatus in accordance with the present invention has been built by the inventors of the present invention has been used to successfully demonstrate the generation of three-dimensional objects.

Figure 12A:
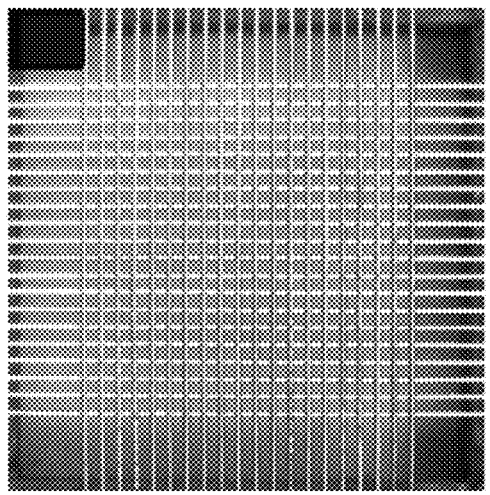
FIGS. 12A-12C are photographic images illustrating aspects of an exemplary implementation of three-dimensional object realization in accordance with the present invention.
Figure 12B:
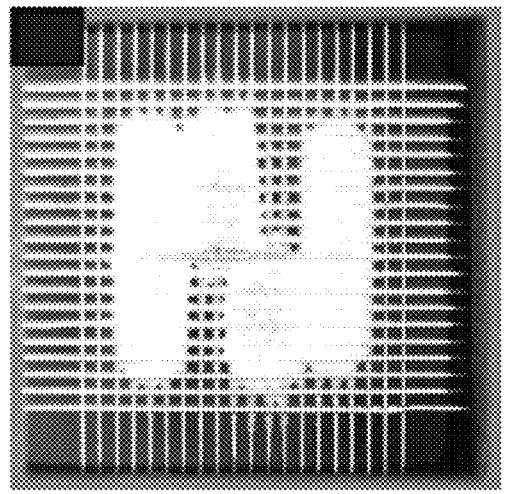
Figure 12C:
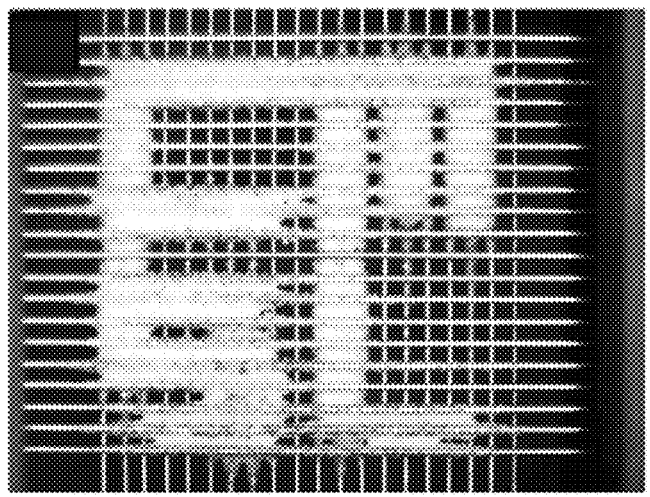

FIGS. 12A-12C illustrate aspects of the present invention as demonstrated with this prototype apparatus. FIG. 12A depicts the wire setup in the build domain prior to the domain being filled with a polymer powder precursor material, where the wire setup consists of three Z layers having 20 wires each. As shown in FIG. 12B, when a predetermined subset of the wires in this setup was activated/deactivated as described above, a single solid letter "N" was formed from the precursor, with the letters "C," "M," "S," and "L" shown in FIG. 12C being formed by the activation/deactivation of other subsets of the wires.

EXAMPLE 2

One of the principal advantages of the proposed methodology is the speed with which components may be volumetrically manufactured. In order to demonstrate these advantages, the inventors conducted a computational experiment. The bracket illustrated in FIG. 9A was both "sliced" for conventional additive manufacturing, and boxelized for volumetric manufacturing in accordance with the present invention. The scale of the object was increased by factors of 2 to 6, and the times required for producing the bracket at each size using conventional additive manufacturing and volumetric manufacturing in accordance with the present invention was recorded as shown by the plots in FIG. 13.

Figure 13:
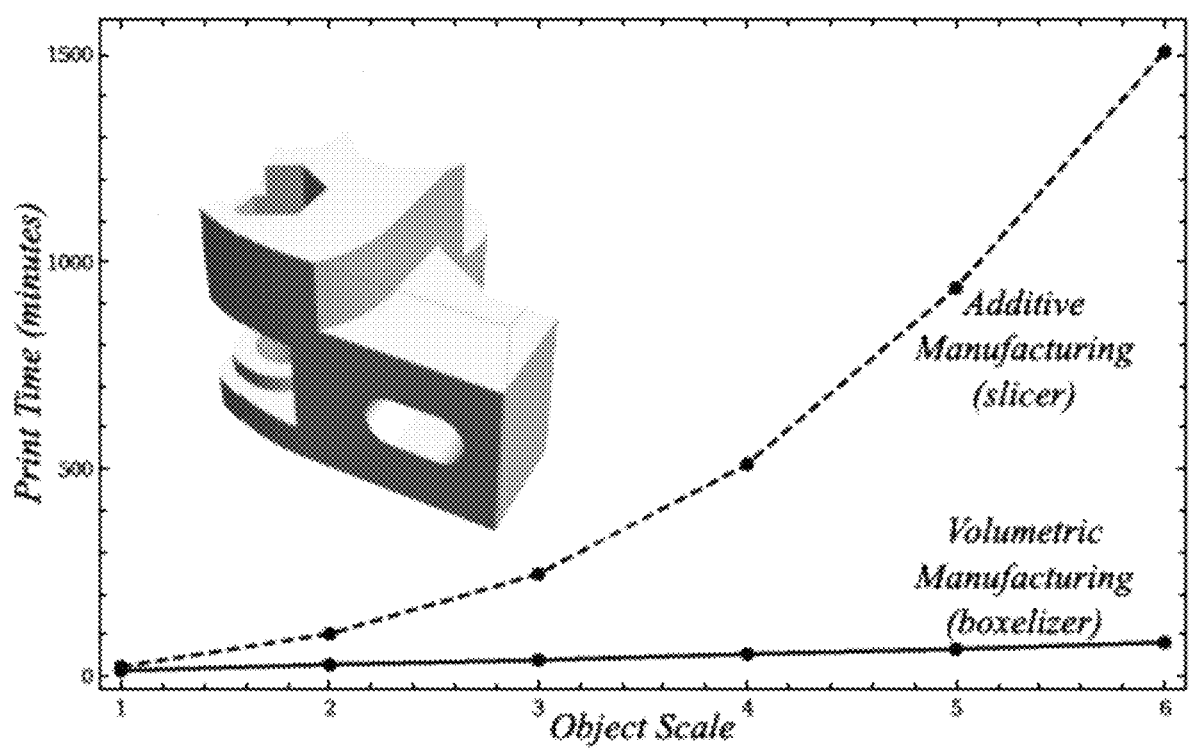
FIG. 13 is a plot illustrating additional aspects of three-dimensional object realization in accordance with the present invention.

The data reflected in FIG. 13 were computed assuming that all boxels were printed sequentially (the most conservative assumption), with each boxel requiring 10 seconds to complete. Because multiple wires in the apparatus in accordance with the present invention can deliver energy to the build volume in a parallel fashion, large boxels may be printed in the same time period as needed for smaller ones, which can dramatically decrease the time required to fabricate a given object. Furthermore, as can be seen from the plots in FIG. 13, the build time needed for the volumetric manufacturing technique in accordance with the present invention scales linearly with the size of the object to be fabricated, while the time required for additive manufacturing grows at a geometric rate relative to object size. This further suggests that volumetric manufacturing may offer an enormous advantage over conventional additive manufacturing in terms of production time efficiency. It is also noted that the performance exhibited for the boxelized geometry in FIG. 13 is not an optimal case since it represents boxels being processed in a completely serial manner, with parallelization of boxels being more advantageous in many cases to obtain a further reduction in associated total build time.

Advantages and New Features

The present invention exhibits at least the following advantages and new features when compared to previously developed additive manufacturing methods and apparatuses:

The method and apparatus of the present invention allow for significant increase in production speed relative to prior additive manufacturing techniques due to its use of volumetric addressability as opposed to the inherently serial zero, one, or two-dimensional point-by-point, path-by-path, and/or layer-by-layer sequential processing of the prior art.

In addition to single object production speed increases, multiple distinct objects may also be created within the same build volume simultaneously in a batch-like process.

No support/anchor material is required for object creation.

Objects resulting from the process can benefit functionally from the composite response resulting from the embedded processing wires (e.g. improved strength to weight ratio or desirable thermal, electrical, photonic, and/or electromagnetic responses).

Parts can be produced with advantageous orientations with respect to their intended functionality.

Pre-tension in wire members may be controlled to promote post-build advantageous states of stress for applications relating to desired functional (fatigue, strength, etc.) performance.

The apparatus requires no moving parts, thus significantly simplifying the process and greatly reducing risks associated with component failure for critical applications, as well as enabling its use on moving platforms (e.g. ships, aircraft, spacecraft, etc.) or machine shop floors under high vibratory conditions.

The method enables the creation of objects with embedded and tailored functionality (e.g. sensors/actuators).

The method enables significantly enhanced design space in terms of precursor and active wire material combinations.

The method enables utilization of a process that can operate at varying initial temperatures, further enhancing the parameter space for the process.

The method enables the processing of materials requiring inert atmospheres, as the build volume may easily be isolated, in contrast to competing processes that require a much larger volume which must be to be atmospherically controlled.

The presence of embedded wires allows for significant flexibility with respect to post-process heat treatment.

Finally, the presence of embedded wires allows for real-time process sensing and control for improved part performance.

The method and apparatus described herein represent a significant departure from all other additive manufacturing approaches that exist to date. This approach addresses limitations in current techniques associated with build time, build time scaling (with object size), in-situ post-processing, part performance/properties and part functionality in a highly tailorable and flexible fashion.

Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein. The present application contemplates any and all modifications within the spirit and scope of the underlying invention described and claimed herein, and all such modifications and alternative embodiments are deemed to be within the scope and spirit of the present disclosure.

What is claimed is:

1. An apparatus for volumetric manufacture of a three-dimensional object, comprising:
  a build domain comprising an enclosed space filled with a precursor material and having a three-dimensional array of wires in a predetermined arrangement extending through the precursor material;
  a power source operatively connected to each of the wires, the power source being configured to controllably apply power individually to each of the connected wires; and
  a controller operatively connected to the power source and to the processor, the controller being configured to control an application of power from the power source to one or more of the wires connected to the power source; and
  a processor operatively connected to the power source, the processor being configured to receive information regarding a desired object to be manufactured and to provide instructions regarding manufacture of the desired object to the controller; and
  wherein power from the power source is applied to a predetermined plurality of wires situated within a predetermined volume within the build domain based on the instructions from the processor to the controller; and
  wherein the precursor material within the predetermined volume in the build domain forms a solid volumetric element as a result of the application of power from the wires extending through the precursor material in the predetermined volume of the build domain.

2. The apparatus of claim 1, wherein the precursor material comprises a polymer powder, a metal powder, a nanoparticle powder, or a ceramic powder.

3. The apparatus of claim 1, wherein the precursor material includes a shape memory material, a magnetic material, and a semiconductor material.

4. The apparatus of claim 1, wherein the precursor material includes a polymer/metal, polymer/ceramic, or metal/ceramic composite material system.

5. The apparatus of claim 1, wherein the processor is configured to receive information regarding at least one process parameter for at least one predetermined volume within the build domain, the instructions from the processor to the controller regarding the application and deactivation of power to the wires within the predetermined volume including the information regarding at least one process parameter.

6. The apparatus of claim 1, wherein the processor is configured to receive data of a volumetric configuration of the entire object to be manufactured and to discretize the volumetric configuration into a plurality of constituent sub-volumes;
  wherein the processor determines a sub-volume of the build domain corresponding to each of the constituent sub-volumes of the object to be manufactured and provides instructions regarding the constituent sub-volumes of the object to be manufactured and the sub-volumes of the build domain to the controller; and
  wherein the power from the power source is applied to each of the sub-volumes in the build domain based on the instructions regarding the constituent sub-volumes and sub-volumes of the build domain from the processor to the controller.

7. A method for volumetric manufacture of a three-dimensional object, comprising:
  providing a build domain comprising an enclosed space having a precursor material situated therein and a three-dimensional array of wires extending through a precursor material in a predetermined arrangement, each of the wires being operatively connected to a power source configured to controllably apply power individually to each of the connected wires;
  receiving, at a processor programmed with appropriate software, information regarding a volumetric configuration of an intended object to be manufactured and information regarding the build domain;
  receiving, at a controller operatively connected to the processor, instructions from the processor regarding an intended object to be manufactured and regarding an application of power to a predetermined plurality of the wires in a predetermined volume of the build domain; and
  applying power to the predetermined plurality of the wires in a predetermined sequence;
  wherein the precursor material in the predetermined volume is transformed into a solid material as a result of the application of power to the wires.

8. The method according to claim 7, further comprising:
receiving, at the processor, information regarding at least one process parameter for at least one predetermined volume within the build domain, the instructions from the processor to the controller regarding the application of power to the wires within the predetermined volume including the information regarding the at least one process parameter.

9. The method according to claim 7, further comprising the following steps performed by the processor:
discretizing the volumetric configuration of the intended object into a plurality of constituent sub-volumes;
determining a sub-volume of the build domain corresponding to each of the constituent sub-volumes; and
providing information to the controller regarding the constituent sub-volumes of the object to be manufactured and the sub-volumes of the build domain to the controller; and
wherein the power from the power source is applied to each of the sub-volumes in the build domain based on the instructions regarding the constituent sub-volumes and sub-volumes of the build domain from the processor to the controller.

* * * * *